(12) United States Patent
MacIntosh Hood et al.

(10) Patent No.: US 9,024,724 B2
(45) Date of Patent: May 5, 2015

(54) LAMINATE TAMPER EVIDENT CONSTRUCT

(76) Inventors: David MacIntosh Hood, Georgetown (CA); Frank Filippelli, Brampton (CA)

( * ) Notice: Subject to any disclaimer, the term of this patent is extended or adjusted under 35 U.S.C. 154(b) by 1014 days.

(21) Appl. No.: 13/120,070

(22) PCT Filed: Nov. 25, 2009

(86) PCT No.: PCT/CA2009/001703
§ 371 (c)(1),
(2), (4) Date: Mar. 21, 2011

(87) PCT Pub. No.: WO2010/060205
PCT Pub. Date: Jun. 3, 2010

(65) Prior Publication Data
US 2011/0169611 A1    Jul. 14, 2011

(51) Int. Cl.
*H04Q 5/22* (2006.01)
*G09F 3/00* (2006.01)
*B32B 7/12* (2006.01)
*B32B 27/10* (2006.01)
*B32B 27/32* (2006.01)
*B32B 37/12* (2006.01)

(52) U.S. Cl.
CPC ............ *G09F 3/0292* (2013.01); *B32B 7/12* (2013.01); *B32B 27/10* (2013.01); *B32B 27/32* (2013.01); *B32B 37/12* (2013.01); *B32B 2309/02* (2013.01); *B32B 2309/14* (2013.01); *B32B 2317/12* (2013.01); *B32B 2519/02* (2013.01)

(58) Field of Classification Search
USPC .................................. 340/10.51, 12.51, 572.1
See application file for complete search history.

(56) References Cited

U.S. PATENT DOCUMENTS

| 5,042,842 | A | 8/1991 | Green et al. |
| 5,418,026 | A | 5/1995 | Dronzek et al. |
| 5,543,191 | A | 8/1996 | Dronzek et al. |
| 6,248,438 | B1* | 6/2001 | Ho et al. .................. 428/330 |
| 6,888,509 | B2* | 5/2005 | Atherton .................. 343/718 |
| 7,279,205 | B2* | 10/2007 | Huffer et al. ............. 428/36.6 |
| 7,342,501 | B2* | 3/2008 | Abbott ..................... 340/572.8 |
| 7,417,550 | B2 | 8/2008 | Brown et al. |
| 2006/0234014 | A1 | 10/2006 | Liu et al. |
| 2008/0011411 | A1* | 1/2008 | Fujita et al. ............... 156/182 |
| 2008/0044603 | A1* | 2/2008 | Hutchinson et al. ...... 428/35.7 |
| 2009/0096703 | A1* | 4/2009 | Chase et al. .............. 343/841 |
| 2010/0051200 | A1* | 3/2010 | Mueller et al. ............ 156/344 |

FOREIGN PATENT DOCUMENTS

CA       2209813       1/1998

* cited by examiner

*Primary Examiner* — Vernal Brown

(57) ABSTRACT

A laminated layered construct is provided. The construct has layered material with a rupturable paper layer cohesively bonded for tamper evident security. The cohesive layer allows for rupturing of a fragile paper layer imparting or providing evidence of tampering. A method of manufacturing laminated layered construct includes a series and combination of steps.

18 Claims, 5 Drawing Sheets

LAMINATE TAMPER EVIDENT CONSTRUCT

This application claims priority to U.S. Provisional Patent Application Serial No. 61/200,216, filed Nov. 25, 2008, and International Application PCT/CA09/01703, filed Nov. 25, 2009 and incorporates the same herein for all purposes.

TECHNICAL HELD

The present invention relates to a multi-layered laminate construct used for security and identification purposes in commercial or non-commercial environments. In particular, the construct allows for rupturing of at least one layer of the construct and for imparting or providing evidence of tampering.

BACKGROUND OF THE INVENTION

The use of polymeric film structures in label applications are often formed from what is commonly referred to as a label-stock. This label-stock typically includes a polymeric film, an adhesive adhered to an outer surface of the film structure, and a releasable liner covering the adhesive. It will be appreciated that the contents of label-stock and the manufacture thereof known in the art rely on costly materials using solvents harmful to the environment.

Polymeric film structures are used in many commercial applications, including tags used to label articles, for example, in airports in that the tags include detailed information of the traveler and carrier used. However, there are numerous drawbacks not only with the manufacture of the devices currently used but also with the tags themselves and the manner in which the tags are applied and used. For instance, it will be recognized and appreciated that it is difficult to determine when an article or baggage has been opened and compromised. More specifically, the currently used baggage tags don't provide any means of showing tampering of the articles and tags attached thereto in a way that would be visible to the naked eye.

There is, therefore, a need in the art for a laminate construct, used with baggages and other containers, where the laminate construct is applied about points of vulnerable weakness of the containers for indicating where the baggage or container has been tampered with and compromised.

SUMMARY OF THE INVENTION

The present invention provides for a laminate construct having a cold-seal adhesive or cohesive, pressure sensitive adhesive or combinations thereof, having a waterborne based polymer used as a base for providing an environmentally friendly manufacturing method and for providing a stable and effective adhesion with a laminate tamper evident construct having at least one layer in combination with the cold seal water-based adhesive of a predetermined colour, under or over an indicia, used in combination with at least one paper layer for showing evidence of tampering when ruptured.

An aspect of the present invention provides laminate construct having a first paper layer bonded with adhesive to an upper portion of a core layer, a second paper layer bonded with the adhesive to a lower portion of the core layer, the first or second paper layers are a synthetic paper or a coated film, for receiving an indicia or image thereon or therein, within or on the layers there is at least one active or passive radio frequency identification tag included within or on the laminate construct which is of a size to accommodate the tags, for example, a width in the range of about 1 cm to about 15 cm, the passive tags being smaller in size (min 0.5 cm) in comparison to the active tags which are known to be larger.

An embodiment of the present invention provides for adhesive to be coloured and the second paper layer to be a recycled rupturable tissue paper of a distinct and noticeable colour.

A further embodiment of the present invention provides for the first paper layer having an image receiving portion being adhered to other laminate layers of the construct by the application of water based adhesives. Some of these adhesives include cold-seal water based cohesives selected from the group consisting of rubber latex, an uncured isoprene, a styrene butadiene rubber, a neoprene and combinations thereof.

A further aspect of the present invention provides for a laminate construct, including a first paper layer bonded with adhesive to an upper portion of a core layer a second paper layer bonded with the adhesive to a lower portion of the core layer, a release liner releasably adhered to the second paper layer by a second adhesive therebetween.

A further aspect of the present invention provides for a method of manufacturing a laminate construct, comprising the steps of (1) applying adhesive to an underside the of core layer, (2) applying a second paper layer to the underside of core layer, (3) applying the adhesive to the top side of core layer, (4) drying, curing and bonding of adhesives and layers, (5) applying a cohesive to the underside of the second paper layer, (6) adhering first paper layer to the top side of core layer and printing the top side of core layer (6) with an image or indicia. Optionally, after step (3) a pressure sensitive adhesive is applied to the second paper layer, wherein a liner is releasably adhered to the pressure sensitive adhesive.

An embodiment of the present invention provides for step (d) being replaced with applying a pressure sensitive adhesive to the second paper layer and where a releasable liner is releasably adhered to the pressure sensitive adhesive.

A further embodiment of the present invention provides for zone 1 to include a temperature of about 70° C. to about 104° C., or zone 2 to include a temperature of about 85° C., wherein lamination proceeds at a speed of about 160 feet per minute and wherein the cohesive is applied at a dry weight in the range of about 3 to about 15 pounds.

An aspect of the invention provides for a laminate construct for printing, the construct comprising at least three layers including one core layer, a first adhesive and a second adhesive bonded to the core layer, wherein the core layer is fixed between a first paper layer and second paper layer, the first paper layer having a top portion and a bottom portion for detachment thereof with a cohesive or cold seal adhesive attached thereto, the first layer or second layer having an image receiving area.

A further aspect of the invention provides for a laminate construct for printing, the construct comprising at least one core layer, a first adhesive and a second adhesive bonded to the core layer, wherein the core layer is fixed between a first paper layer and second paper layer, the first paper layer having a top portion and a bottom portion for detachment thereof with a cold seal adhesive or cohesive attached thereto, the first layer or second layer having an image receiving area.

An even further aspect of the invention provides for a laminate construct, the construct comprising at least four layers including a core layer having a first part and a second part, a first adhesive and a second adhesive bonded to the core layer, wherein the core layer is fixed between a first paper layer and second paper layer, the first paper layer having a top portion and a bottom portion wherein a third adhesive is fixedly attached thereto for releasable detachment of part or all of the first paper layer, and a backing layer releasably attached to the third adhesive. An embodiment of the present invention provides for at least one layer having a radio frequency identification device thereon for secondary tampering and identification measures.

Another aspect of the invention provides for a laminate construct comprising a core layer, a first adhesive and a second adhesive bonded to the core layer, wherein the core layer is fixed between a first paper layer and second paper layer, the first paper layer having a top and bottom portion for detachment from a cold seal adhesive or cohesive attached thereto, the first layer or second layer having an image receiving area.

A further aspect of the invention provides for a laminate construct comprising a core layer having a first part and a second part, a first adhesive and a second adhesive bonded to the core layer, wherein the core layer is fixed between a first paper layer and second paper layer, the first paper layer having a top and bottom portion wherein a third adhesive is fixedly attached to the bottom portion thereto for releasable detachment of part or all of the first paper layer, and a liner releasably attached to the third adhesive.

An embodiment of the present invention provides for at least one layer of the multi-layered laminate construct including paper, a synthetic paper or a coated film, impregnated or coated with a radio frequency identification device (rfid) active or passive. If and when tampered with the laminate construct will rupture and impart an indication that the labelled article has been tampered with. The active rfid devices having at least two parts, first part including an integrated circuit for storing and processing information, modulating and demodulating a radio-frequency (rf) signal, and other specialized functions, the second part is an antenna for receiving and transmitting the signal for indicating that tampering of the article in question is evident.

Another embodiment of the present invention provides for a rfid is on or in the cohesive layer. Preferably, the passive rfid is used for reasons of manufacturing costs, smaller sizes and when radio frequency waves from a reader are encountered by the passive rfid device within the construct, the coiled antenna within the device forms a magnetic field drawing power therefrom and energizing the circuits in the device and construct. The laminate construct and device therein transfers information encoded therein.

A further embodiment of the present invention provides for the laminate construct to be ruptured to the point of disabling the coiled antenna and preventing any signal from being emitted in the passive rfid, thereby providing an indication of tampering with the article attached therewith.

An embodiment of the present invention provides for any one of the adhesives being of a predetermined colour to provide clear indication of rupturing or detachment of any one of the paper layers from the core layer, the image accepting layer or combinations thereof. The first paper layer being of a light weight tissue type which is preferably recycled tissue. An indicia-receiving portion of the first paper layer, of the second paper layer or both being disfigured when detached from any one adhesive or cohesive that are water-based adhesives.

A further embodiment of the present invention provides a core layer used for reinforcement, and wherein the cold seal cohesive is water-based and is a rubber latex, an uncured isoprene, a styrene butadiene rubber, a neoprene or combinations thereof.

Another embodiment of the present invention provides for at least one print receiving layer of the multi-layered laminate construct consisting of paper, a synthetic paper or a coated film wherein the print receiving layer is adhered to a top or bottom portion of a first paper layer, a second paper layer, a third paper layer or a combination thereof.

Another aspect of the present invention provides a tamper evident construct having a core film, wherein the core layer is positioned between a first image accepting layer and second paper layer, an adhesive for bonding the first paper layer and second paper layer to the core layer, a cold seal water-based cohesive coated inner surface opposed the first image accepting layer.

A further embodiment of the present invention provides for a first adhesive and a second adhesive being permanently bonded to a first paper layer and a second paper layer.

A further aspect of the invention provides for a method of manufacturing a laminate construct, comprising the steps of applying a first adhesive to a first part of a core layer, fixing a first paper layer to the core layer, applying a cohesive to the first paper layer for releasable attachment thereto, and applying a second adhesive to a second part of the core layer.

An even further aspect of the invention provides for a method of manufacturing a laminate construct comprising the steps of applying a first adhesive to a first part of a core layer, fixing a first paper layer to the core layer, applying adhesive to the first paper layer, applying and fixing a second adhesive to a second part of the core layer and applying a third adhesive to the first paper layer and adhering a releasable backing layer thereto.

An embodiment of the present invention provides for the method of manufacture wherein the fixing step includes a drying process and a curing process which is repeated after the step of applying the second adhesive. Prior, during or after the curing and drying process an image is applied to at least one layer during or after lamination of the construct.

In another aspect of the present invention there is provided a method for manufacturing a laminate construct comprising the steps of applying a first adhesive to a first part of a core layer, fixing a first paper layer to the core layer, applying a cohesive to the first paper layer for releasable attachment thereto, and applying a second adhesive to a second part of the core layer.

A further embodiment of the present invention provides for a reinforcing core layer, and for the cold seal water-based cohesive being comprised of a rubber latex, an uncured isoprene, a styrene butadiene rubber, a neoprene or combinations thereof.

A further aspect of the present invention provides a method for manufacturing a laminate structure for use in a tamper evident device having the steps of laminating a reinforcing core with water-based or extrusion polymer adhesive to a paper by applying a the adhesive to the core, heating in a first zone and in a second zone at a predetermined temperature at a predetermined speed, bonding drying and curing applying a paper layer then applying the water-based cohesive to the lamination. The film, paper and cohesive structure is laminated to the image accepting layer by applying a polymer adhesive to the core, heating in a first zone or optionally in a second zone at a predetermined temperature and speed for bonding, drying and curing the first paper layer also termed as an image accepting layer.

In an embodiment of the present invention there is provided a film, paper and cohesive structure which is laminated to the image accepting layer by applying a polymer adhesive to the core, heating in a first zone and in a second zone at a predetermined temperature at a predetermined speed, bonding drying and curing applying the image accepting layer.

An even further embodiment of the present invention provides for the first zone having a temperature of about 104° C. and the second zone having a temperature of about 85° C., laminated at a speed of about 160 feet per minute, and wherein the aforesaid process is repeated.

An embodiment of the present invention provides the indicia-receiving portion of the first image accepting layer or of the second paper layer being applied during or after the manufacturing process, wherein the indicia is on the underside, topside or a combination of both showing a mark of choice.

Another embodiment of the present invention provides waterborne adhesives applied to the laminate during the manufacture thereof, and wherein the cohesive is applied at a predetermined dry weight in the range of about 3 to about 15 pounds.

Another embodiment of the present invention provides for predetermined widths of product produced in the range of about 10 mm to 150 mm.

A further aspect of the present invention provides for a method of tagging an article of interest in which the end user applies on to the device the appropriate details, applying the device about the article and effecting cohesive opposing faces to engage the article. In the event of tampering the second paper layer will be ruptured indicating tampering.

DETAILED DESCRIPTION OF THE DRAWING

DETAILED DESCRIPTION OF THE INVENTION

Figure 1:
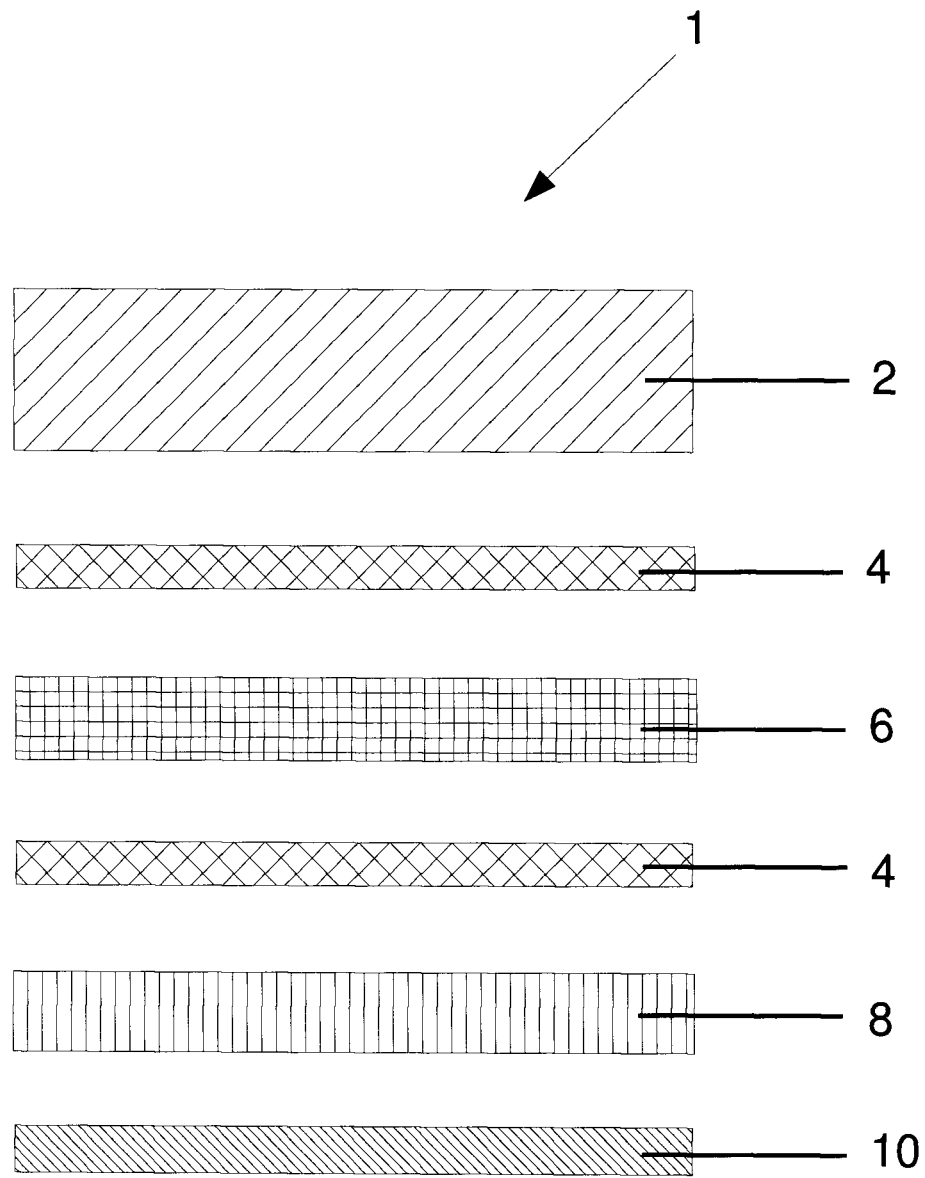
FIG. 1, shows an exploded cross-sectional side view profile of an embodiment of the invention.

FIG. 1 represents an exploded cross sectional view of each component of the construct 1 of the present invention. An image accepting/receiving first paper layer 2 (alternatively called an image accepting layer) can include an indicia or image (not shown) used for providing end user or customer details, alternatively the first paper layer 2 can be used to include a radio frequency identification device (not shown) as a means to indicate the loss of an article (B) shown in FIG. 5, attached to the construct 1, or rupturing of at least one layer of construct 1. The first paper layer 2 (image accepting layer) can be direct thermal paper depending on the method of printing can also be film, paper or a variety of other stocks that will accept an image, hence an image accepting layer.

Figure 6:
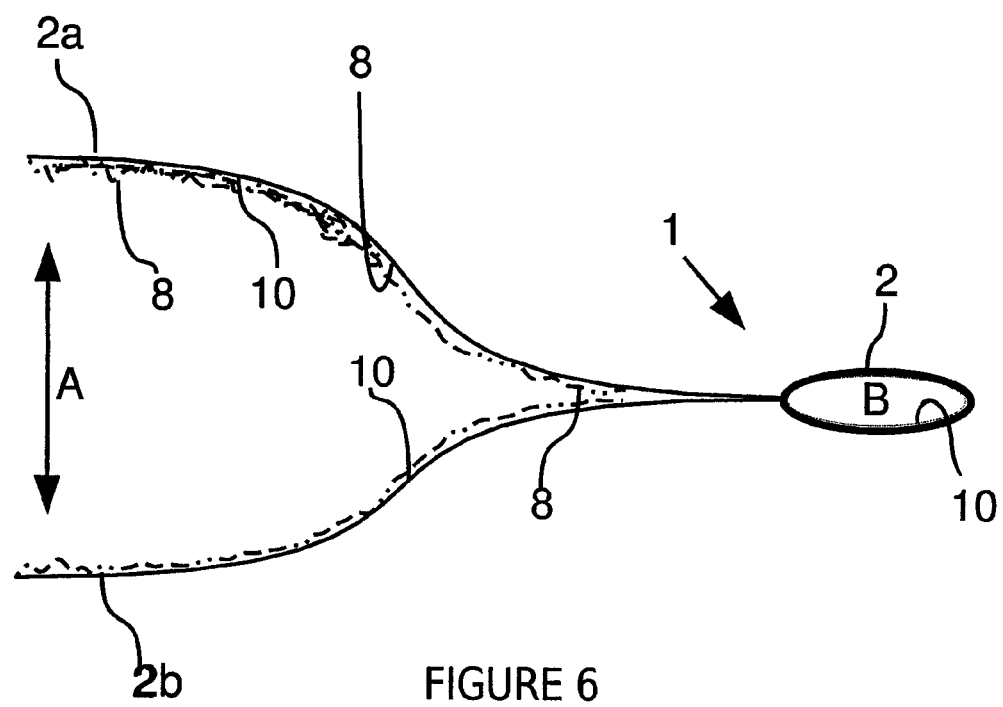
FIG. 6, shows a compromised laminate construct of the present invention.

Bonding adhesive 4, during manufacture, bonds the first paper layer 2 and a fragile second paper layer 8 to opposite sides of a reinforcement core layer 6 (hereinafter referred to as a core layer 6). Preferably, a cohesive 10 is applied to the fragile second paper layer 8 for providing evidence of tampering as shown in FIG. 6.

Figure 2:
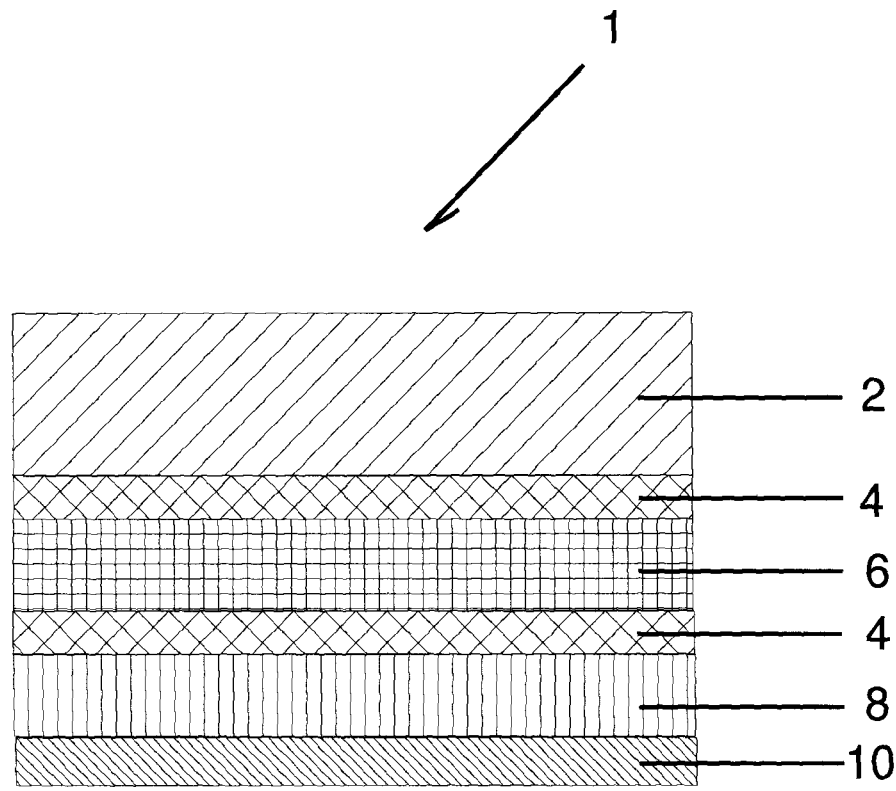
FIG. 2, shows a cross sectional view profile of the laminate construct of the invention.

Referring to FIG. 2, construct 1 in manufactured form provides at least three layers 2, 6 and 8 bonded together by at least one type of bonding adhesive 4. Optionally, preferably the bonding adhesive 4 can be tinted to provide a further indication of tampering of the construct 1 visible to the naked eye over a large area as the type of tinted colour used is luminescent. Bonding adhesive 4, bonded to the lower portion of the core layer 6, adheres to the second paper layer 8 for allowing evidence of rupturing when in use. The second paper layer 8 can be made of light weight paper for detachment, preferably recycled rupturable tissue paper, preferably the a fragile paper layer.

Figure 3:
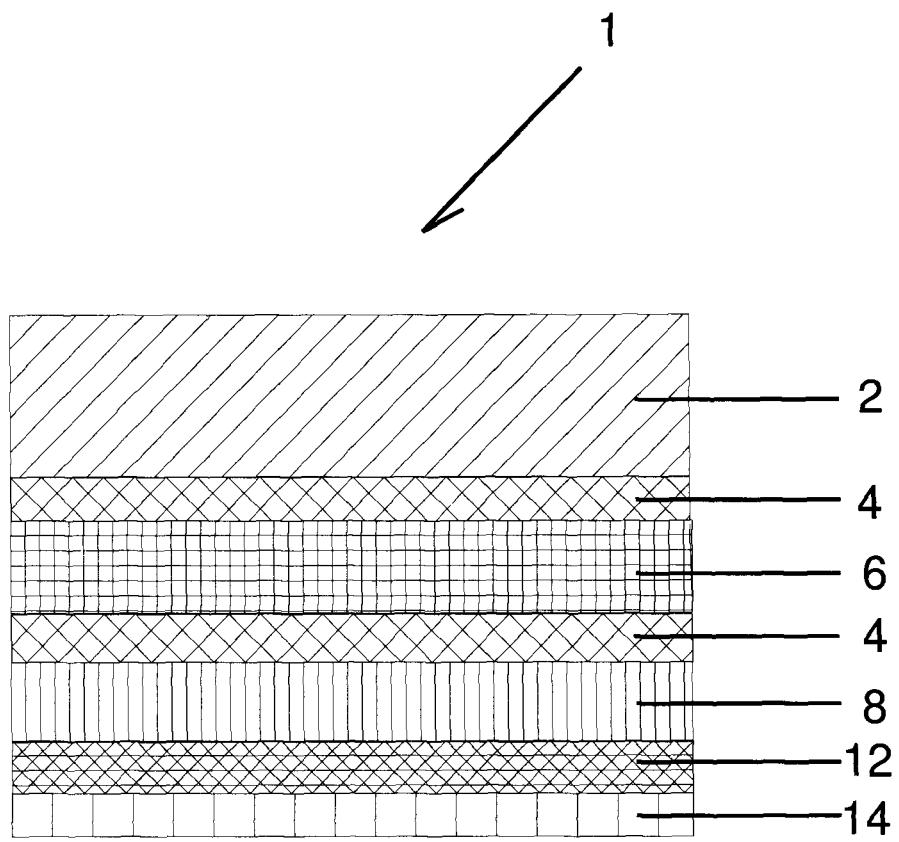
FIG. 3, shows a cross sectional side view profile of another embodiment of the invention

FIG. 3, provides an embodiment of the present invention in that second paper layer 8 is bonded to a pressure sensitive adhesive (psa) 12 which in turn has a releasably attached liner 14 thereon. The psa 12 is preferably a water based pressure sensitive adhesive having environmentally friendly qualities. The release liner 14 is preferably a 70 grams per square meter (gsm) or 80 gsm densified haft with a known release coating on one side, the uncoated side has preferably at least one colour or image/indicia accepting surface.

Figure 4:
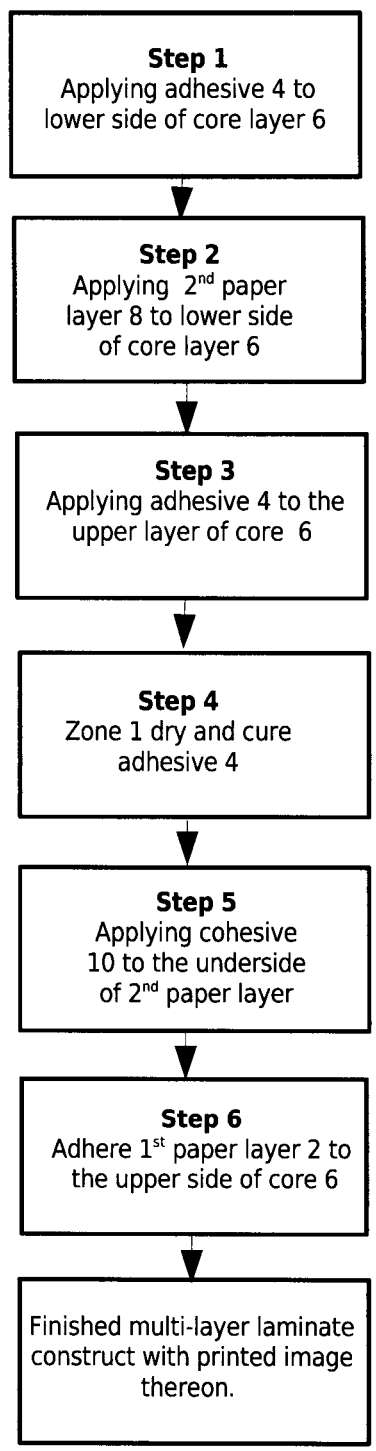
FIG. 4, shows an embodiment of the present invention used manufacture of a laminate construct.

In FIG. 4, an example of a manufacturing process for the laminate construct 1' which includes step 1—of applying the water based polymer adhesive 4 to a lower side of core layer 6, step 2—applying the second paper layer 8 to the lower side of the core layer 6, step 3—applying adhesive 4 to the upper layer of 6, step 4—drying off the water from the adhesives 4 of the partial construct and curing the adhesives 4 in a first zone at predetermined intervals, temperatures and speeds, step 5—applying cohesive 10 to the under side of the second paper layer 8, step 6—adhering the first paper layer or image receiving layer 2 to the upper side of core layer 6. Optionally, after step 5 an adhesive 12 is applied to a release liner 14 by means of the Mayer rod system, the adhesive is then dried and cured in a second zone of the same oven at about 75° C. to about 85° C. at a speed of about 35 meters per minute to about 45 meters per minute.

Preferably, the first zone can have a temperature of about 80° C. to about 120° C. and the second zone having a temperature of about 50° C. to about 120° C., laminated at a speed of about 30 meters per minute to about 60 meters per minute.

More preferably, the first zone (step 4) could have a temperature of about 104° C. and the second zone (after step 5) has a temperature of about 85° C., and the lamination process occurs at a speed of about 160 feet per minute. The image receiving portion of the first paper layer 2 or the release liner 14 is applied during or before completion of the final laminate construct, wherein the indicia/image is on the underside, topside or a combination of both showing a mark of choice. The core layer 6 is preferably a reinforcing core and the cold seal cohesive 10 is preferably a rubber latex, an uncured isoprene, a styrene butadiene rubber, a neoprene or combinations thereof. More preferably adhesives 4 or 12 are applied to the construct substrates during the manufacture thereof, and the cohesive 10 is applied at a predetermined dry weight in the range of about 5 to 10 pounds. The adhesive 12 is applied to the release liner 14 by means of a Mayer rod system (not shown), however, there are other means of applying adhesive in such a manufacturing environment, accordingly, the present invention is by no means limited to the use of only the Mayer Rod system. The adhesive 12 can then be dried and cured at between 50° C. and 80° C. More preferably at 79° C. at a speed of from about 20 meters per minute to about 40 meters per minute. More preferably at 37 meters per minute. The combination of the release liner 14 and psa 12 is then laminated to the second paper layer 8, the core layer 6 with the bonding adhesive 4 either side of the core layer 6 with the first paper layer 2.

The first paper layer 2 can be uncoated paper, paper with a thermal transfer coating, paper with direct thermal coating or combinations thereof. Preferably, the first paper layer 2 is a direct thermal paper layer having a predetermined grade as found in generic thermal papers. The bonding adhesive 4 can be, for example, an acrylic pressure sensitive adhesive known in the art.

However, other well known bonding adhesives have been contemplated as one skilled in the art would appreciate. Preferably, the adhesive 4, 12, is tinted with a predetermined colour for showing a contrast in colour between the colour of at least one ruptured paper layer 2, 8, and the tinted adhesive 4, 12, or vice-versa, in that the at least one paper layer 2 or 8, is tinted and the adhesive 4, 12, is clear.

More preferably, the cohesive 12 does not leave any residue on the article (B) and is the choice adhesive 12 for that reason. The core layer 6 is a reinforcement film that is made from polypropylene, polyester, polyolefin, polyethylene or combinations thereof. Preferably the core layer 6 is a biaxially oriented polypropylene film available, for example from AmTopp Products Group.

The second paper layer 8 is optionally an alternative offset paper which provides, when in combination with the laminate construct, the rupturing effect used for indicating tampering. Widths of the construct 1 are produced in the range of about 10 mm to 150 cm, preferably from about 50 mm to 10 cm. However, as one skilled in the art would appreciate these dimensions can vary depending on the requirements and operating machine capabilities.

Figure 5:
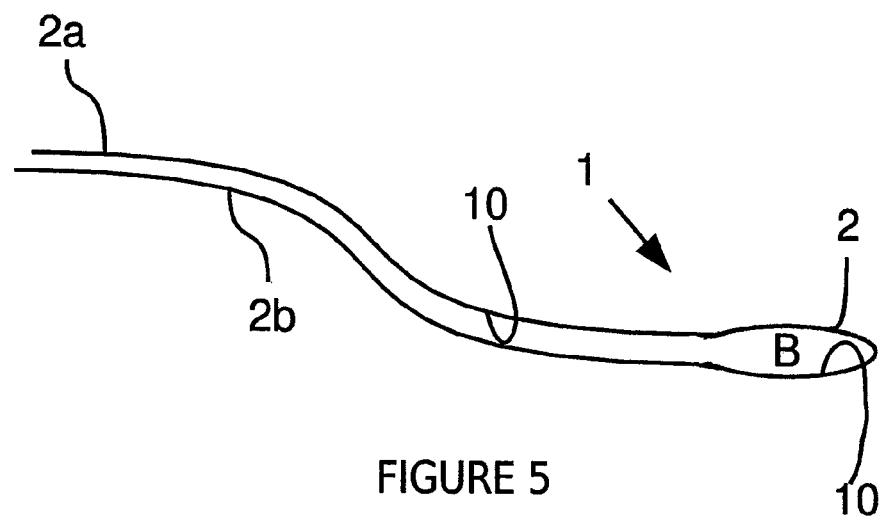
FIG. 5, shows and in tact use of the laminate construct.

Referring to FIGS. 5 and 6, there is provided an exemplary indication of how the tamper evident construct 1 is used. An in-tact construct 1 as shown in FIG. 5 includes the image layer 2 folded around article (B) having opposed sides. Strips 2*a* and 2*b* of the construct 1 show two separate unjoined strips with cohesive 10 to be contacted with one another, character "B" represents, as an example, the article (B) used with the construct 1. FIG. 6, indicates the tampering and rupturing of the construct denoted by character "A" with construct 1 clearly showing the ruptured strips 2*a* and 2*b* of the second paper layer 8.

Preferably, at least one layer 2, 8 or 14 of the multi-layered laminate construct comprising paper 14, a synthetic paper or a coated film impregnated or coated with a passive or active radio frequency identification device (rfid) (not shown). The rfid devices having at least two parts, first part including an integrated circuit for storing and processing information, modulating and demodulating a radio-frequency (rf) signal, including other specialized functions for security measures. The second part has an antenna for receiving and transmitting the signal for indicating that tampering (A) of the article (B) in question is evident. The rfid is inserted onto or into the laminate construct, preferably between one of the paper layers 2, 8 and 14 and/or one of the adhesive layers 4, 12. More preferably, the core layer 6 includes the rfid located either on the top, on the bottom or in the middle portions of the core layer 6.

More preferably, at least one of the layers 2, 8 or 14 of the laminate construct includes paper, a synthetic paper or a coated film, which is impregnated or coated with an active or passive radio frequency identification device (rfid). If and when tampered with the laminate construct will rupture (A) and impart an indication that the labeled article (B) has been tampered with. The active rfid devices having at least two parts, first part including an integrated circuit for storing and processing information, modulating and demodulating a radio-frequency (rf) signal, and other specialized functions, the second part is an antenna for receiving and transmitting the signal for indicating that tampering of the article (B) in question is evident.

Preferably, the passive rfid is used for reasons of manufacturing costs, smaller sizes and when radio frequency waves from a reader are encountered by the passive rfid device within the construct, the coiled antenna within the device forms a magnetic field drawing power therefrom and energizing the circuits in the device and construct. The laminate construct 1 and device therein transfers information encoded therein. When ruptured, the laminate construct 1 is disabled and the coiled antenna prevents any signal from being emitted in the passive rfid, thereby providing an indication of tampering with the article (B) attached therewith.

The tamper evident laminate construct of the present invention can be applied in an assortment of applications where tamper evident needs are required. Accordingly, there appears to be a need in high human traffic areas including airports, train stations, shipping docks and other means of travel. As one would appreciate this type of tamper evident construct is not limited to only the transport of articles and people carrying those articles.

It will be apparent to those skilled in the art that modifications to those preferred embodiments may be made without departing from the spirit of the invention.

We claim:

1. A laminate construct comprising: a first paper layer bonded with an adhesive to an upper portion of a core layer, a second paper layer bonded with the adhesive to a lower portion of the core layer, a cohesive adhered to a lower portion of the second paper layer and wherein the second paper layer comprises a rupturable paper.

2. The laminate construct of claim 1, wherein the adhesive or cohesive is colored.

3. The laminate construct of claim 1, wherein the rupturable paper is a recycled tissue.

4. The laminate construct of claim 1, wherein the core layer is a biaxially oriented polypropylene film.

5. The laminate construct of claim 1, wherein the cohesive is pressure sensitive.

6. The laminate construct of claim 1, wherein the adhesive is water based.

7. The laminate construct of claim 1, wherein the cohesive is a cold-seal water based cohesive selected from the group consisting of rubber latex, an uncured isoprene, a styrene butadiene rubber, a neoprene and combinations thereof.

8. The laminate construct of claim 1, wherein the first paper layer is a synthetic paper or a coated film, for receiving an indicia or image thereon or therein.

9. The laminate construct of claim 1, wherein an active or passive radio frequency identification tag is included within or on the laminate construct.

10. A method of manufacturing a laminate construct, comprising the steps of:
   (1) applying adhesive to an underside the of a core layer
   (2) applying a second paper layer to the underside of core layer
   (3) applying the adhesive to the top side of the core layer
   (4) drying and curing of adhesive in steps (1), (2) and (3),
   (5) applying a cohesive to the underside of the second paper layer,
   (6) adhering first paper layer to the top side of the core layer.

11. The method of claim 10, wherein after step (3) a pressure sensitive adhesive is applied to the second paper layer.

12. The method of claim 10, wherein a liner is releasably adhered the pressure sensitive adhesive.

13. The method of claim 10, wherein step (4) includes a temperature of about 70° C. to about 104° C.

14. The method of claim 10, wherein step (4) includes a temperature of about 85° C.

15. The method of claim 10, wherein lamination proceeds at a speed of about 160 feet per minute.

16. The method of claim 10, wherein the cohesive applied at step (5) at a dry weight in the range of about 3 pounds to about 15 pounds.

17. The method of claim 10, wherein the construct has a width in the range of about 1 cm to about 15 cm.

18. The method of claim 10, wherein the first paper layer or image receiving layer has an indicia or image applied thereto.

* * * * *